Nov. 18, 1930.　　　　R. I. GRAVES　　　　1,781,839
VENDING MACHINE
Filed May 11, 1925　　　9 Sheets-Sheet 2

Inventor
Ralph Ireson Graves
By Semmes & Semmes
Attorneys

Nov. 18, 1930.   R. I. GRAVES   1,781,839
VENDING MACHINE
Filed May 11, 1925   9 Sheets-Sheet 4

Inventor
Ralph Ireson Graves
By Semmes & Semmes
Attorney

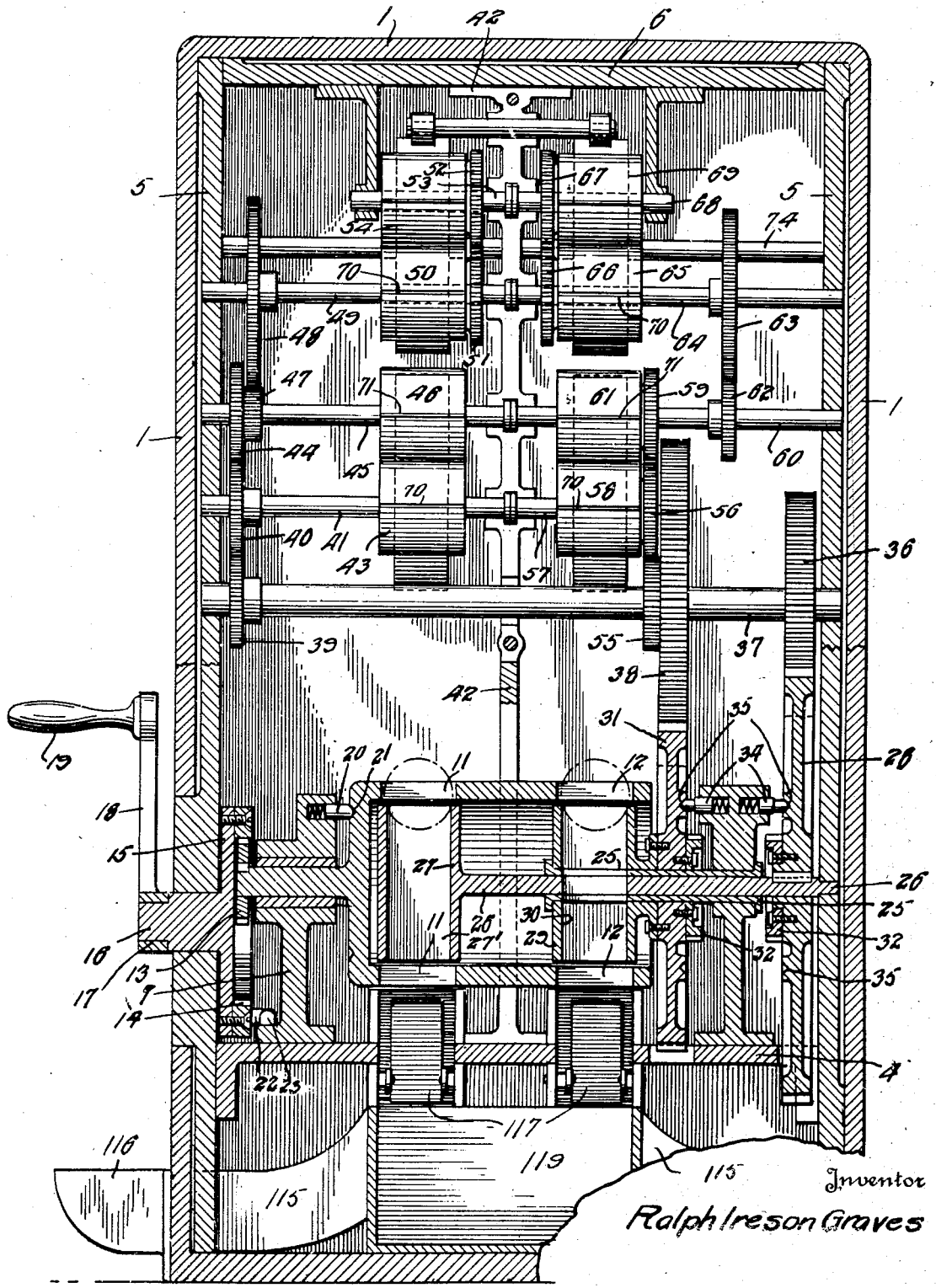

Nov. 18, 1930.  R. I. GRAVES  1,781,839
VENDING MACHINE
Filed May 11, 1925  9 Sheets-Sheet 6
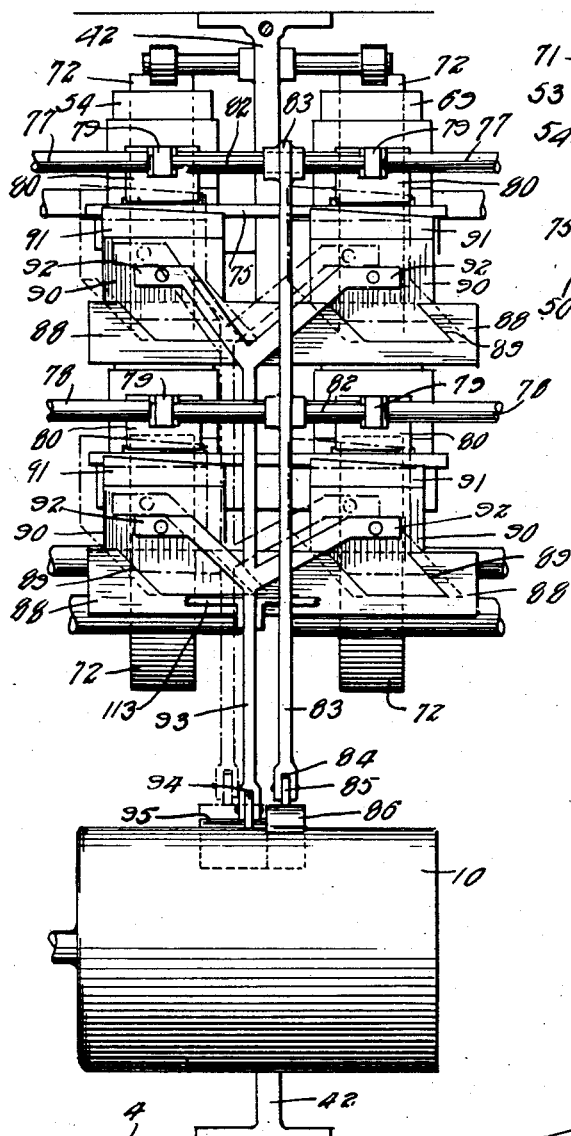
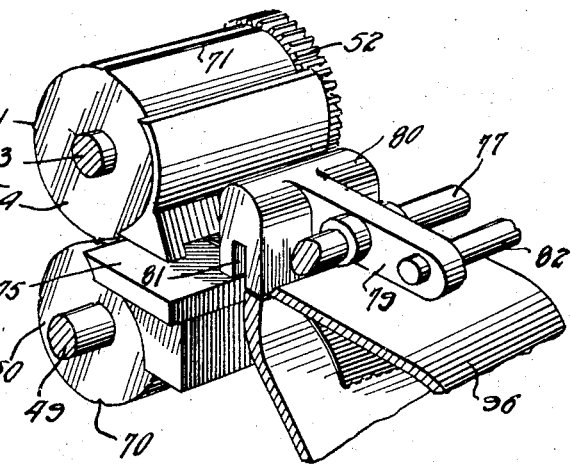
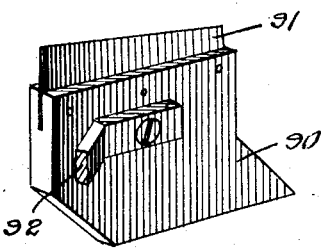
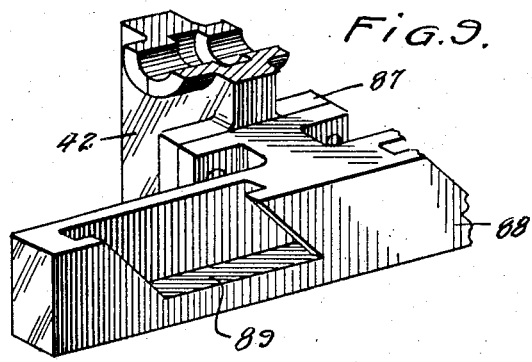
Inventor
Ralph Ireson Graves
By Semmes & Semmes
Attorneys Nov. 18, 1930.  R. I. GRAVES  1,781,839
VENDING MACHINE
Filed May 11, 1925   9 Sheets-Sheet 7

Inventor
Ralph Ireson Graves
By Semmes & Semmes
Attorneys

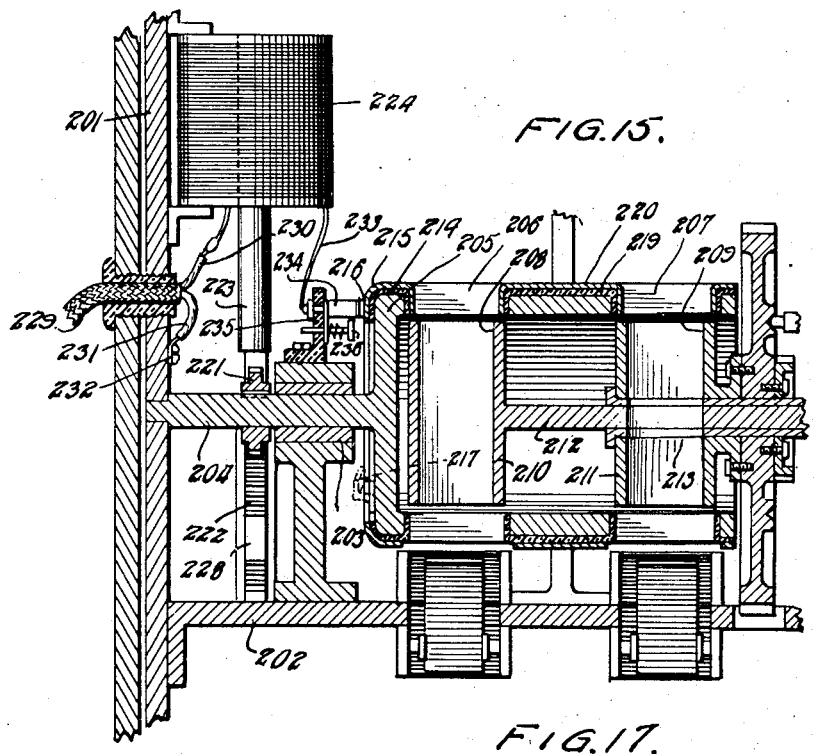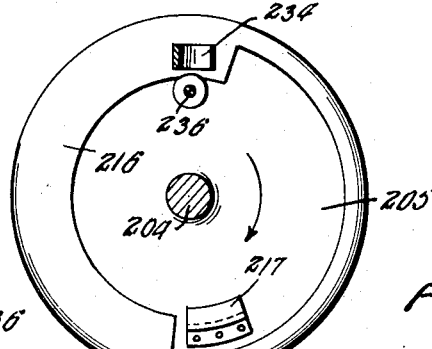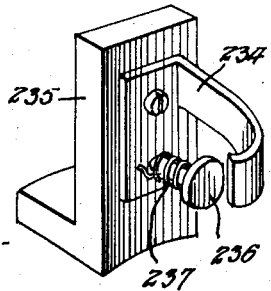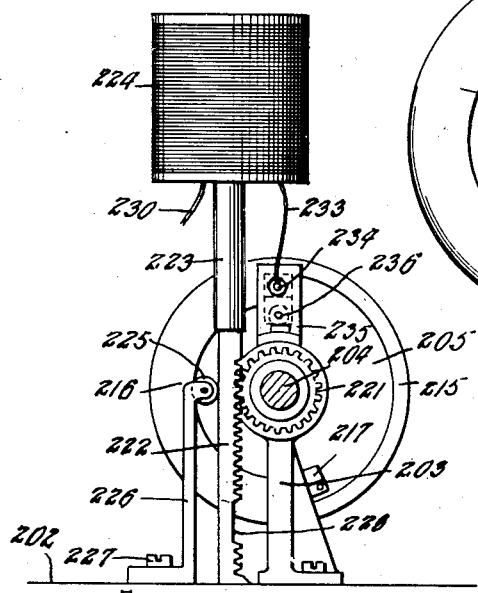

Nov. 18, 1930.   R. I. GRAVES   1,781,839
VENDING MACHINE
Filed May 11, 1925    9 Sheets-Sheet 9
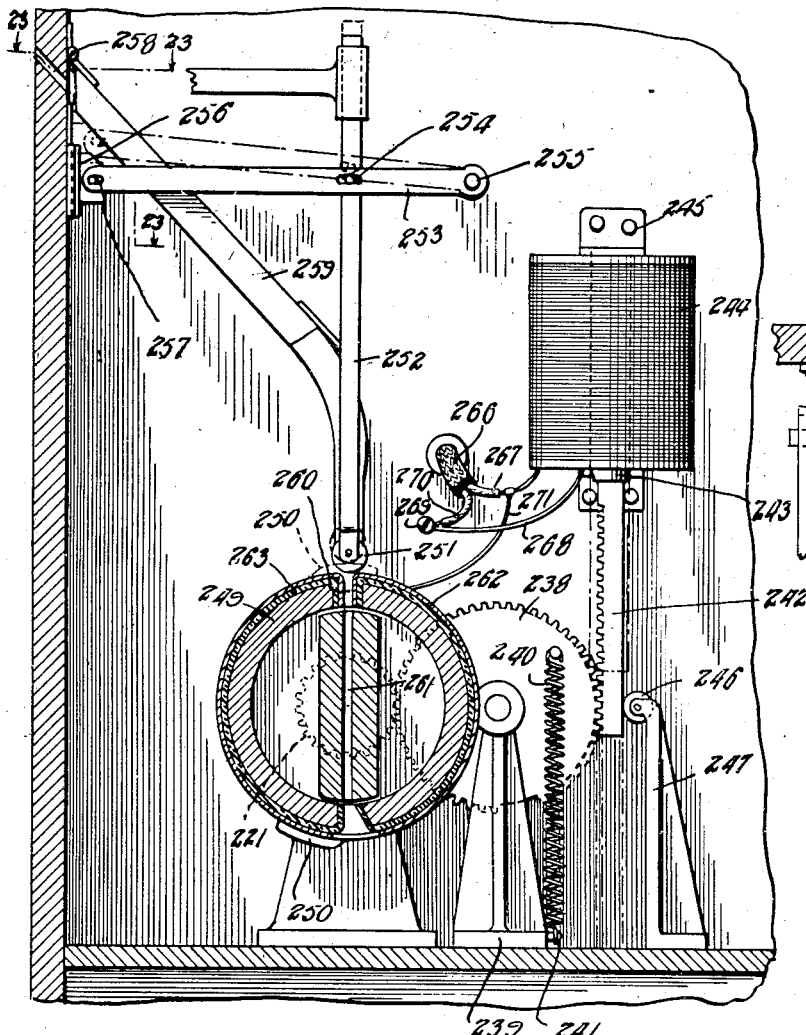
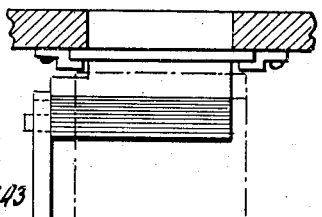
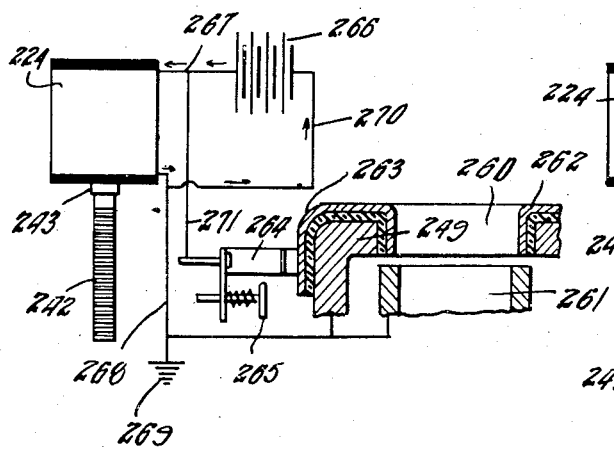
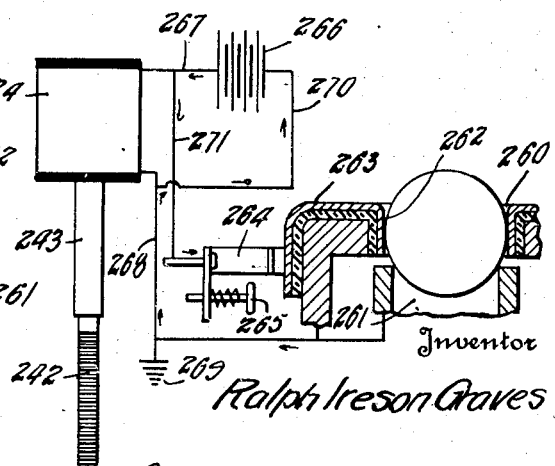
Inventor
Ralph Ireson Graves
By Simms & Simms
Attorney Patented Nov. 18, 1930

1,781,839

UNITED STATES PATENT OFFICE

RALPH I. GRAVES, OF WASHINGTON, DISTRICT OF COLUMBIA, ASSIGNOR TO MILDRED VAN SWERINGEN GRAVES, OF CHEVY CHASE, MARYLAND

VENDING MACHINE

Application filed May 11, 1925. Serial No. 29,498.

This invention relates to coin controlled vending machines.

An object of the invention is to vend a combination of stamps of different values, simultaneously, by the use of one coin.

Another object of this invention is to provide a coin controlled stamp vending machine with a means for detecting the use of slugs made of magnetic materials, such slugs being employed for fraudulent purposes.

Another object of this invention is to provide a coin controlled stamp vending machine which will return to the operator any coin used other than a coin of a predetermined denominational value for the use for which the machine is constructed.

Still another object of this invention is the production of an automatic electrically operated coin controlled vending machine. The electrical operating means can be either an open or a closed circuit, adapted to be closed or short circuited, as the case may be, upon depositing a coin in the machine. In either case the operation will be effectively accomplished.

Yet another object of this invention is the production of an automatic electrically operated coin controlled vending machine, so designed and constructed that by a substitution of the feed rollers constituting the measuring means, can be easily and quickly adjusted or altered to vend many articles other than stamps.

A further object of this invention is to provide a coin controlled stamp vending machine which will be automatically closed against the deposit of a coin, when the supply of stamps is exhausted.

A still further object of this invention is the production of a coin controlled stamp vending machine which can be quickly adjusted by a substitution of gears to vend a great many combinations of stamps for one or two coins.

Yet a further object of this invention is to provide a coin controlled stamp vending machine which will have a high efficiency in operation and yet a marked simplicity as a whole and in respect to each of its component parts, so that its manufacture is economically facilitated both as regard to parts and its assembly.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Fig. 5 is a vertical sectional view taken on line 5—5 of Figure 2,

Figure 1:
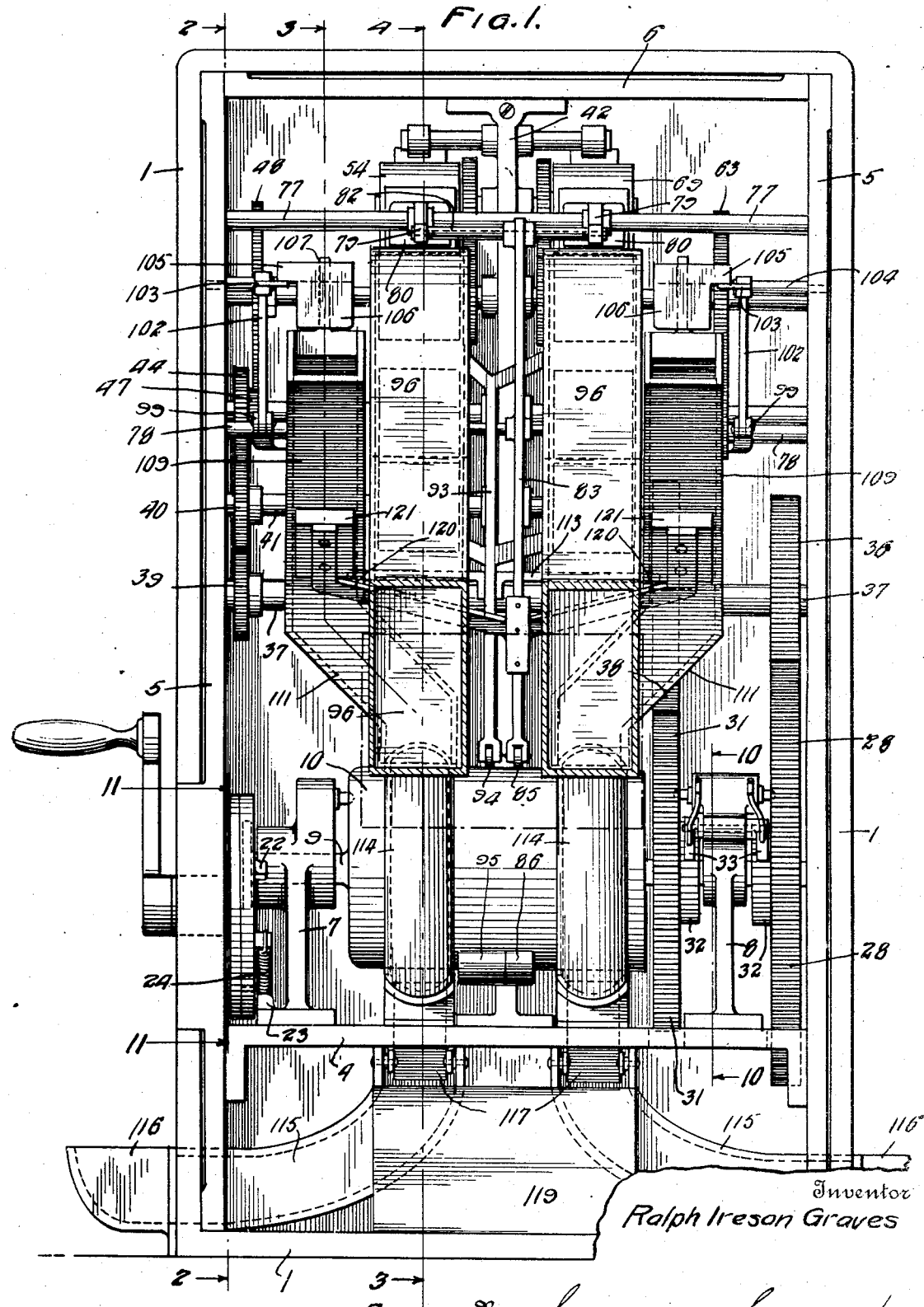
Figure 1 is a front elevation, the front of the casing being removed.
Figure 2:
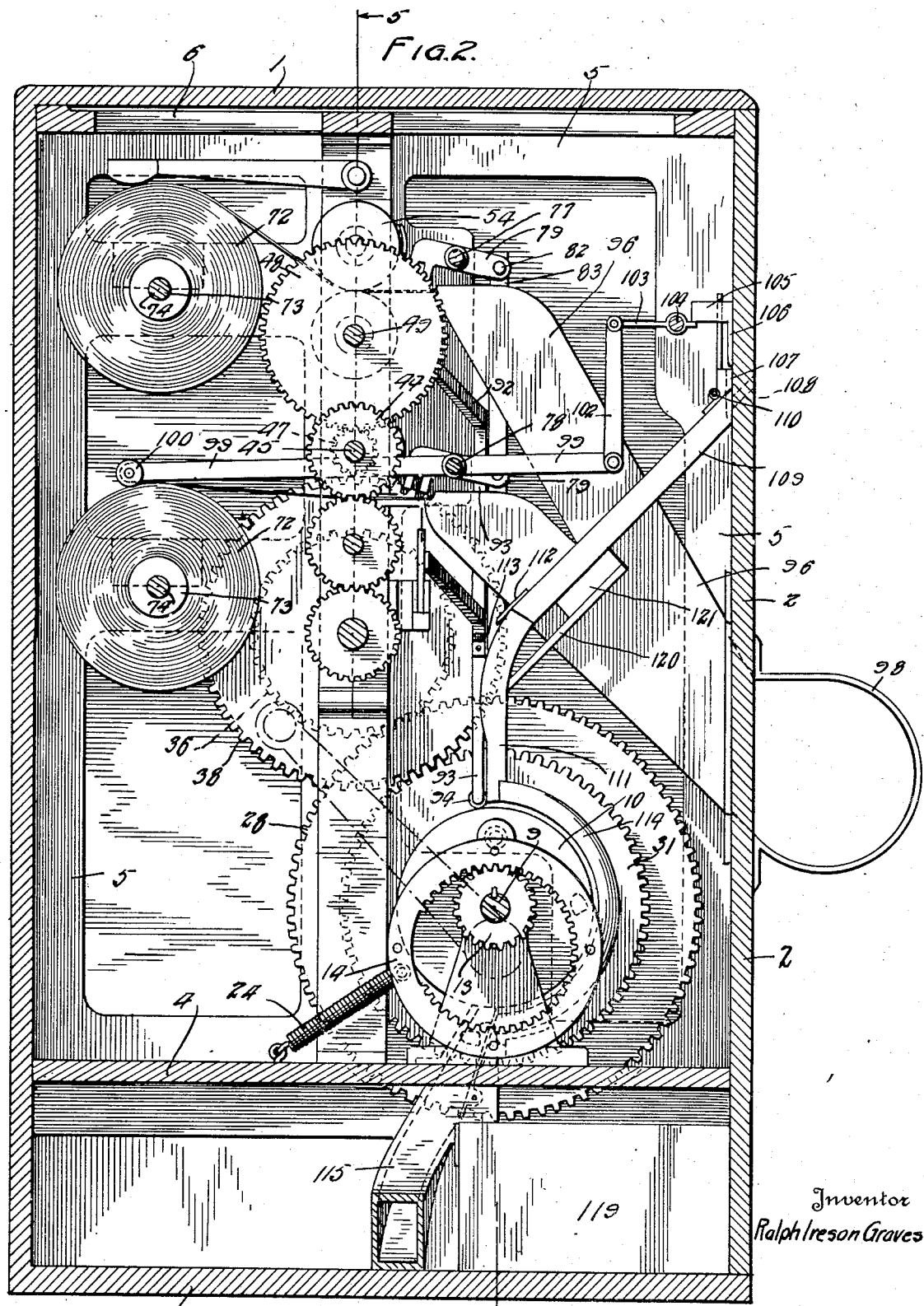
Figure 2 is a vertical sectional view taken on line 2—2 of Figure 1.
Figure 3:
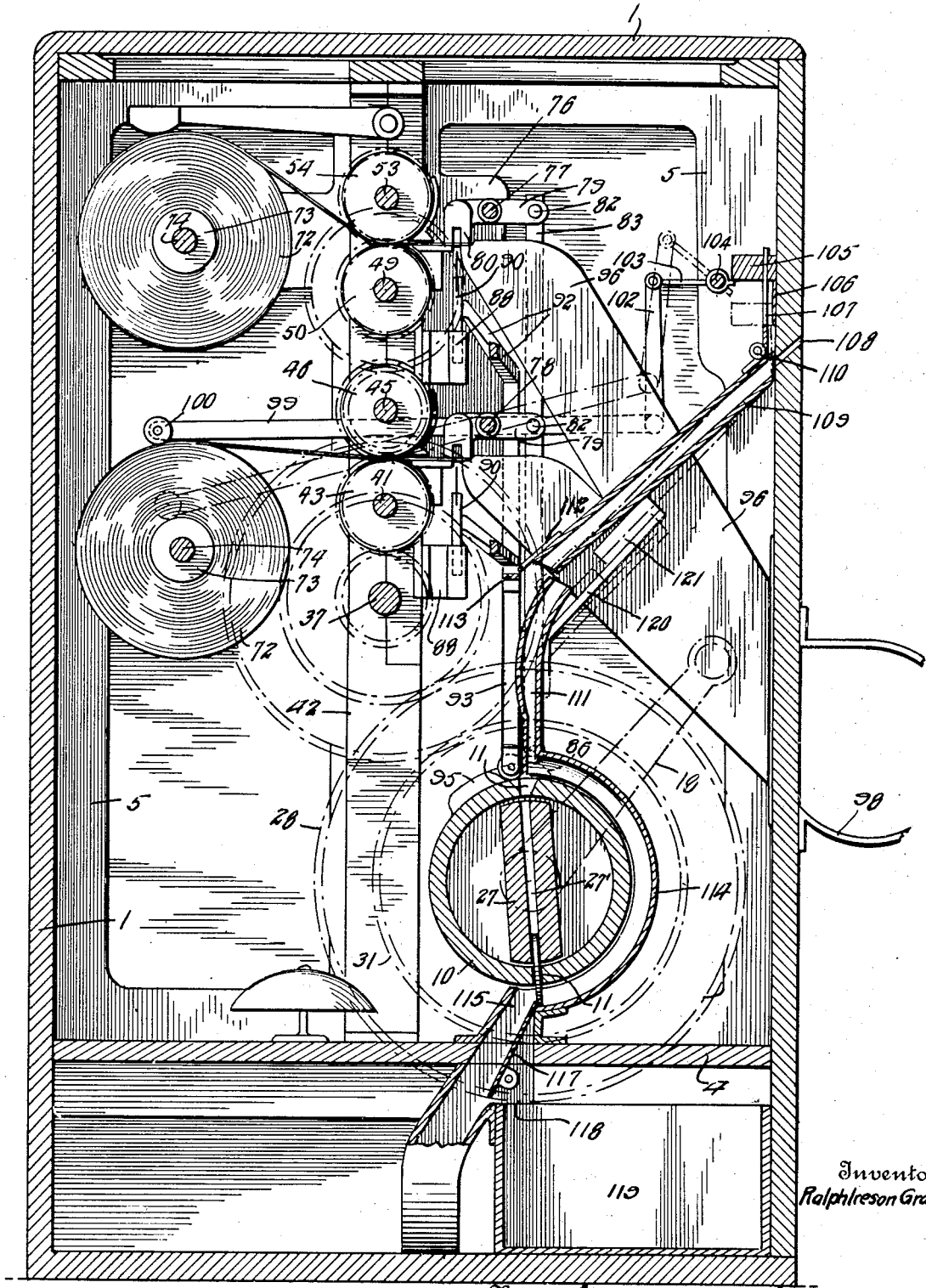
Figure 3 is a vertical sectional view taken on line 3—3 of Figure 1.
Figure 4:
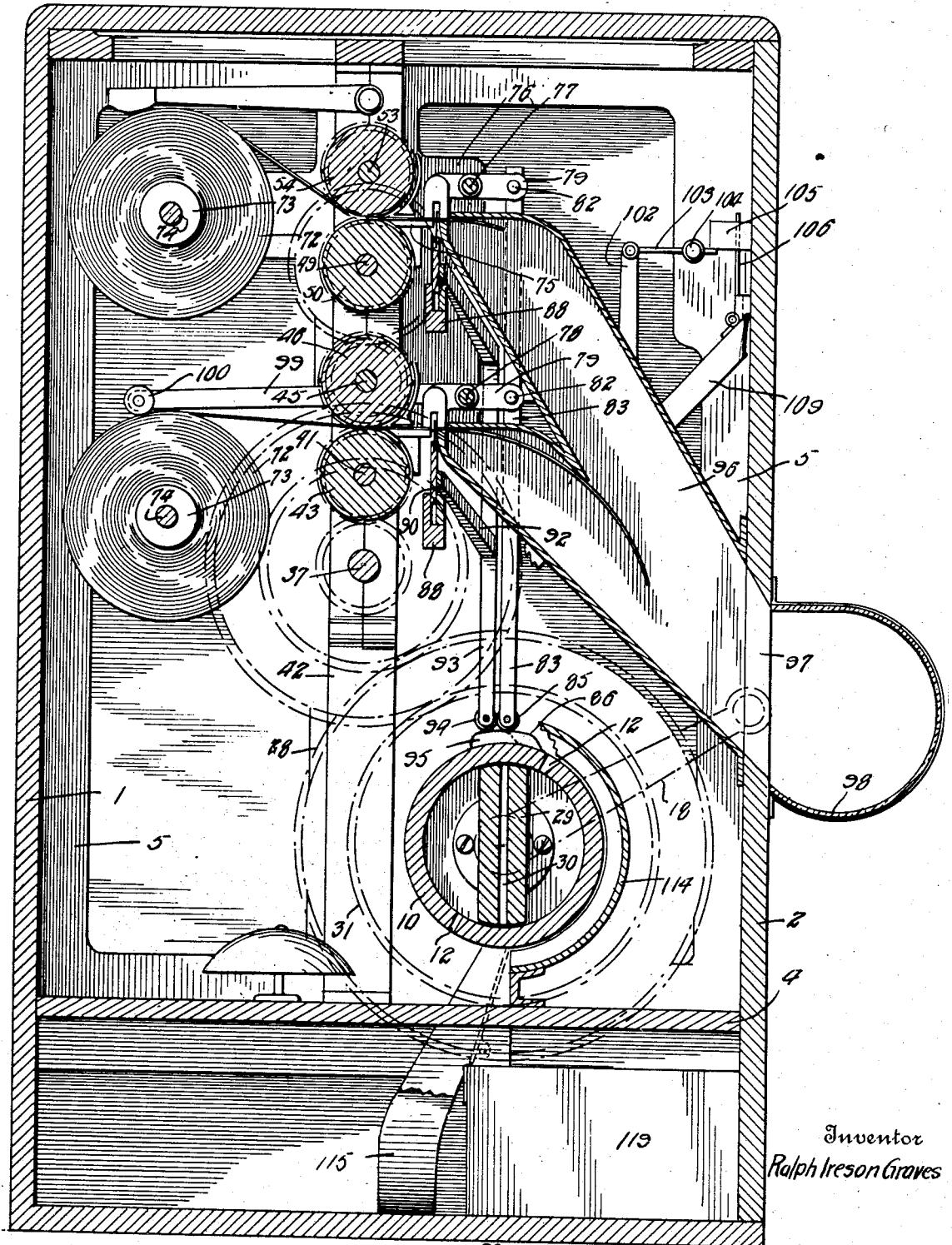
Fig. 4 is a vertical sectional view taken on line 4—4 of Figure 1.
Figure 10:
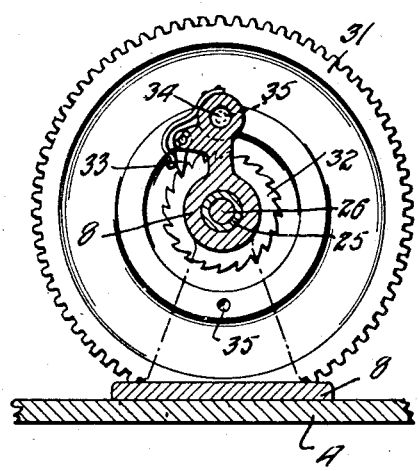
Figure 11:
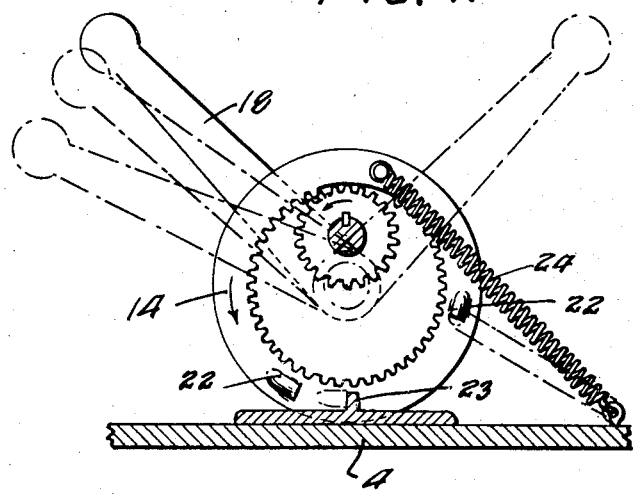
Figure 12:
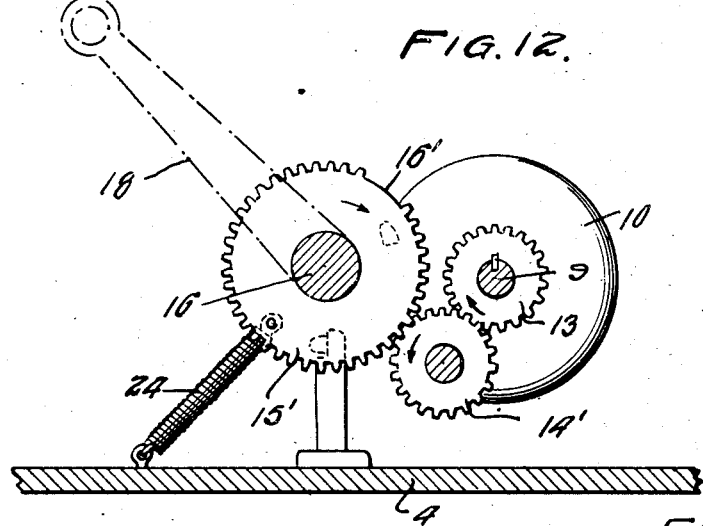
Figure 13:
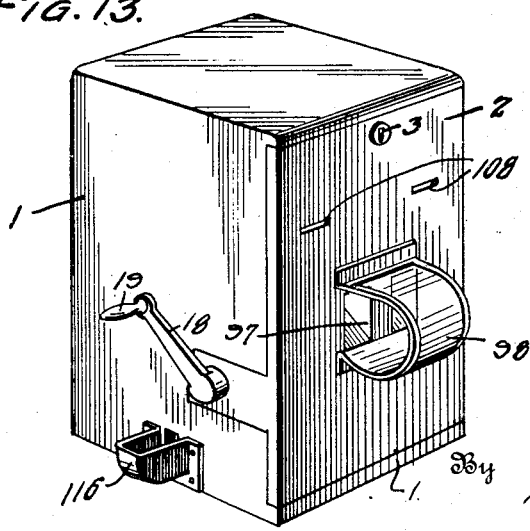
Figure 14:
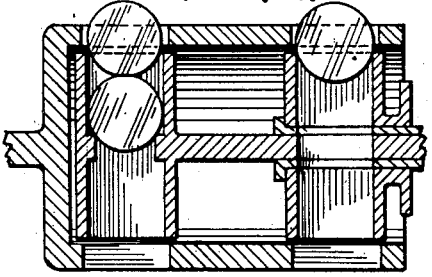

Fig. 6 is an enlarged front elevation illustrating the action of the stamp shearing and clamping members, Fig. 7 is an enlarged detail perspective view illustrating the relation of the feed rollers to the stamp clamping members, Fig. 8 is an enlarged detail perspective view of the stamp cutting knife or blade and guide in which the blade is mounted, Fig. 9 is an enlarged detail perspective view of the knife guide mounted upon a shaft bearing support, Fig. 10 is a sectional view taken on line 10—10 of Figure 1, illustrating in side elevation the pawl and ratchet for preventing a backward movement, Fig. 11 is a sectional view taken on line 11—11 of Fig. 1 illustrating in side elevation the drive mechanism and spring for returning the crank to its normal position, Fig. 12 is a modified form of the drive mechanism, Fig. 13 is a perspective view of a complete machine with cover in place, Fig. 14 is a detailed view in section illustrating the use of two coins and one coin respectively, Fig. 15 is a vertical sectional view illustrating a machine equipped with an electrical operating mechanism, Fig. 16 is a side elevation of the drive mechanism illustrating a rack and pinion operated by a solenoid, Fig. 17 is a side elevation of a contact plate and a circuit opening and closing device, Fig. 18 is a perspective view of a brush and a contact button to operate in conjunction with the circuit opening and closing device, Fig. 19 is a perspective view of a contact, Fig. 20 is a diagrammatical illustration of a normally open circuit, Fig. 21 is a diagrammatical illustration of a circuit operating and closing device, Fig. 22 is a vertical sectional view illustrating a slot closing device, and an electrical operating means, Fig. 23 is a detail view illustrating a slide for closing the slot, and Figures 24 and 25 are diagrammatical views illustrating the application of a closed circuit.

Referring by numerals to the drawings 1 represents a casing which is substantially rectangular in general contour. The casing is formed with an integral back, top, bottom and side portions, in which is fitted a front 2 having the usual locking means 3. The casing may, however, be otherwise formed according to the fancy of the manufacturer.

Mounted upon the front 2 is a rectangular frame adapted to fit snugly within the casing 1. The rectangular frame comprises a base 4 oppositely disposed vertical upright sections 5 and transverse or horizontal top sections 6. Mounted upon the base 4 are suitable bearings 7 and 8. Journaled in the bearing 7 is a shaft 9 formed integral with a drum 10 having corresponding and oppositely disposed slots 11 and 12.

Upon the opposite ends of the shaft 9 is keyed a gear 13 in mesh with an internal gear 14, a section of the gear teeth being cut away, the object of which will hereinafter appear. The internal gear 14 is mounted on a sleeve 15 formed upon a shaft 16 journaled in one of the upright sections 5. The shaft 16 is provided with a shoulder 17 upon which is mounted a crank 18 having a handle 19 for operating same. This drive mechanism is most clearly shown in Figure 11.

Mounted upon the bearing 7 is a spring actuated pin 20 engaging an aperture 21 in the drum 10, the object of which is to check the movement of the drum after it has moved 90°. The object of checking the movement of the drum will hereinafter appear. The movement of the crank 18 is limited by the lugs 22 carried upon the sleeve 15 which engage a stop 23 upon the base plate 4. When the crank is moved forward in the operation of the machine it is returned after having completed its stroke to its normal position by a coil spring 24. The spring 24 connects the sleeve 15 to the base plate 4.

In Figure 12, I have shown a modification of the drive mechanism wherein the spur gear 13 keyed upon the shaft 9 is in mesh with a gear 14'. The gear 14' meshes with a gear 15' having a portion of its teeth cut away as shown at 16'. The gear 15' is mounted upon the shaft 15 and is connected by a spring 24 to the base.

Either of the drive mechanisms herein shown and described will efficiently perform its intended functions. However, the increased cost of manufacture of an internal gear such as is shown in Figure 11 may be such an item in the production of the machine that it would be preferable to install or substitute the form shown in the modification.

Mounted in the bearing 8 upon the base plate 4 is a sleeve 25 journaled in which is a shaft 26. The shaft 26 and sleeve 25 project into the drum 10. The shaft 26 is provided upon its end with a member 27 having a slot 27' adapted to register with the oppositely disposed slots 11 in the periphery of the drum. The shaft 26 extends through the sleeve 25 and has its other end journaled in one of the uprights 5. Keyed upon the shaft 26 between the bearing 8 and the upright 5 is a gear 28 the object of which will hereinafter appear.

Mounted to revolve upon the sleeve 25 within the drum 10 is a member 29 having slots 30 adapted to register with the oppositely disposed slots 12 in the periphery of the drum 10, and with a slot in the sleeve 25 and shaft 26 when the machine is in its normal position. The member 29 is keyed to a gear 31 also mounted to revolve upon the sleeve 25. Each of the gears 28 and 31 carries a ratchet 32 in mesh with a pawl 33 adapted to prevent a backward movement of the gears. Mounted upon the bearing 8 are oppositely disposed spring actuated pins 34 adapted to engage depressions 35 in the sides of the sprockets 28 and 31 upon each revolution of 180°, so as to insure the proper position of the gear when at rest.

The gear 28 is in mesh with gear 36 keyed upon a transverse shaft 37 journaled in the uprights 5, and the gear 31 is in mesh with a gear 38 mounted to revolve upon the shaft 37. Keyed or otherwise secured upon the shaft 37 is a gear 39. The gear 39 which is driven by shaft 37, meshes with a gear 40 keyed upon a shaft 41 journaled in one of the uprights 5 and a central support 42. The shaft 41 carries and drives the delivery roller 43. The gear 40 meshes with and drives a gear 44 keyed to a shaft 45 upon which is mounted a delivery roller 46 immediately above and bearing against the delivery roller 43.

A gear 47 is keyed upon the shaft 45 in mesh with and adapted to drive a gear 48 keyed upon a shaft 49 upon which is keyed a delivery roller 50. A gear 51 is keyed to the shaft 49 in mesh with a gear 52 keyed to a shaft 53 upon which is keyed and adapted to be driven thereby a delivery roller 54 immediately above and bearing against the delivery roller 50.

Mounted to revolve upon the shaft 37 and keyed to the gear 38 which is driven by the gear 31, is a gear 55. The gear 55 is in mesh with and is adapted to drive a gear 56 keyed upon a shaft 57 upon which is mounted a delivery roller 58. The gear 56 engages and drives a gear 59 mounted upon a shaft 60 to which is keyed a delivery roller 61 immediately above and bearing upon the delivery roller 58. A gear 62 meshes with and drives a gear 63 mounted upon a shaft 64. The shaft 64 carries a delivery roller 65 and a gear 66. The gear 66 meshes with and drives a gear 67 mounted upon a shaft 68. A delivery roller 69 is keyed upon the shaft 68 immediately above and bearing against the delivery roller 65.

The delivery rollers 43, 50, 58, and 65 are each provided with grooves or slots 70 in their peripheries. These grooves or slots 70 extend substantially the axial length of the rollers. The slots 70 are spaced apart at a distance which would be equal to the length of a stamp between its perforated edges, and the delivery rollers 46, 54, 61, and 69 are provided with projections or ridges 71, extending substantially the axial length of the rollers, on their peripheries in the same relative positions as the grooves, thus the projections 71 will engage the grooves 70 upon the rotation of each set of delivery rollers together, the object will hereinafter appear.

The stamps are in rolls 72 mounted upon rollers 73 journaled upon shafts 74 supported upon the frame in any suitable manner. The stamps are fed to the delivery rollers by inserting the first stamp in each roll between the rollers so that the first row of perforations in each roll of stamps will be engaged by one of the projections on the delivery rollers and locked therein by the registering groove in the co-operating roller.

Mounted upon the upright 42 adjacent to the respective sets of delivery rollers are tables 75 over which the stamps freely slide as they are delivered by the delivery rollers, the tables 75 being so located with respect to the delivery rollers that upon each revolution of the delivery rollers stamps are slid across the tables until their lines of perforation are opposite the outer edges of the tables, the object of which will hereinafter appear.

Formed integral with the uprights 5 are webs 76 on which are mounted corresponding transverse shafts 77 and 78 opposite the delivery rollers 46, 61, 54, and 69 respectively. Mounted upon the shafts 77 and 78 are rocker arms 79 having upon their free ends clamping devices 80, the faces of which are slotted as shown at 81. Each pair of the rocker arms 79 are connected by their ends opposite the clamping devices 80 with a short rod 82 upon which is pivotally mounted a vertical rod 83. The rod 83 has a bifurcated end 84 in which is mounted a roller 85 normally bearing against the periphery of the drum 10 and adapted to engage the cam 86. Upon the roller 85 engaging the cam 86 an upward motion is imparted to the rod 83 which through its pivotal connection with the clamping devices forces the clamping devices down upon the stamps and clamps the stamps upon the tables where they are firmly held during the proceeding operation.

Formed upon the vertical support 42 are arms 87 supporting plates 88 in which are formed diagonal guideways 89. Mounted to slide in the diagonal guideways 89 are plates 90 supporting tapering blades 91. Since the blades 91 are tapered their cutting edges are maintained at an angle to the tables 75, the object of which will hereinafter appear. The plates 90 are connected by arms 92 to a vertical rod 93. The lower end of the rod 93 is bifurcated to receive a roller 94 which normally bears against the drum 10 and engages a cam 95 during its course of travel.

It will be seen that as the drum 10 revolves the roller 94 engages its periphery and will travel thereupon until it engages the cam 95 when an upward motion is imparted to the rod 93 upon which is formed the arms 92 attached to which are the plates 90 mounted in the diagonal guideways 89, thus an upward and diagonal motion is imparted to the blades 91 causing them to move across the edges of the tables 75 with a shearing motion. The blades pass upward in the bifurcated faces 81 of the clamping devices 80 which have been previously brought to bear against the tables and clamp the stamps thereupon.

As the blades 91 sever the stamps at their perforated lines the stamps are dropped in corresponding chutes 96. The chutes 96 are bifurcated to receive the stamps from one lower and one upper table and to convey them by gravity to openings 97 in the front of the casing which is provided with a suitable transparent cover 98 adapted to prevent the stamps from being ejected and yet afford a suitable means for their reception.

Mounted upon the shaft 78 are rocker arms 99 provided at their free ends with idlers 100 adapted to engage the stamp rollers 72 mounted upon the shaft 74. The other end of the arms 99 are pivoted to arms 102 connected to triggers 103 pivoted upon the frame as at 104 with their free ends engaging finger 105 carried by slides 106 mounted in guideways 107 secured to the casing on the respective sides of each slide 106.

As the stamps are delivered from the rolls of stamps 72 the idlers 100 tend to stabilize the feeding thereof and to prevent the rolls from becoming loose. As the rolls of stamps diminish the idlers 100 gradually move toward the centers of the rolls or shafts upon which the rolls are mounted, and in so doing lower the triggers 103. The movement of the triggers is so scaled or graduated as to lower slides 106 until they reach a point immediately opposite the slots 108, at which point the supply of stamps upon the rollers 73 is exhausted, and upon such supply being exhausted the slides 106 are released and by gravity travel through the guideways 107 to close the slots 108 to prevent the further use of the machine until such time as a new supply has been furnished.

The slots 108 communicate with corresponding chutes 109. The chutes 109 are formed of non-magnetic material and are hinged at their tops as shown at 110 above the slots in such a manner that their lower ends may be raised. The lower ends of the chutes 109 communicate with chutes 111 and are normally held in position by arms 112 also adapted for engagement with arms 113 on the vertical movable rods 93, the object of which will hereinafter appear.

The chutes 111 communicate with the slots 11 and 12 in the periphery of the drum 10 which register with the slots in the rotatable members 27 and 29. The slots in the drum and rotatable members are in such proportion as to support the coin for which the machine is designed and to pass all other coins of a smaller size. Connected with the chutes 111 are semi-circular guides 114. The guides 111 are adjacent to the drum 10 and communicate with chutes 115 which connect with pockets 116 on the exterior of the case, the object of which will hereinafter appear. Mounted in the chutes 115 are traps 117 normally closing ports 118 communicating with the cash box 119 in the base of the machine.

Mounted upon the rod 83 are arms 120 upon which are attached fixed magnets 121 normally resting against the lower exterior faces of the non-magnetic chutes 109. Upon placing a slug, used for the purpose of defrauding, in the machine it slides down the chute 109 until it is attracted by the magnetic flux of the fixed magnet 121 where it is held. The magnet is mounted on an arm connected to the rod 83, thus the free end of the chute is caused to raise when the rod 83 engages the cam 86 and upon a further revolution of the drum 10 the cam 95 causes the vertical movable shaft 93 to rise. As the shaft 93 rises the arm 113 carried thereby engages the arm 112 upon the free end of the chute 109 and raises the chute 109 sufficiently to remove the slug from its contact with the fixed magnet, where upon the slug continues on its course through the chute 109 and is ejected in the base of the machine upon the bell which gives an alarm indicating that the machine has been tampered with.

Upon depositing the wrong coin or a coin of greater or less value than the coin required to operate the machine, such coin being smaller in diameter, the coin passes through the chutes 109 and 111 down through slots 11 and 12 as the case may be, through the slotted members 27 and 29 and the chutes 115 out of the machine into the cups 116 thus returning the coin to the purchaser who has made the error in the use of the improper coin.

Upon deposit of the proper coin in the machine the coin passes down the chute 109 or 111 and lodges in the slot 11 or 12 as the case may be and engages the slot in the member 27 or 29 the diameter or the length of the slots being less than the diameter of the coin. The coin so located locks the drum 10 and members 27 or 29 as the case may be. By exerting a pull upon the crank handle 19 the drum and the slotted member or members therein are caused to revolve and in revolving drive the train of gears operating the stamp delivery rollers.

Figures 1 to 11 both inclusive illustrate a machine of a special design for vending 4 one-cent stamps and one charity stamp, simultaneously upon depositing a coin, a nickel, in the left hand coin slot and pulling the crank forward to the end of its stroke and releasing the same to return automatically to its original position. This particular construction also vends two, two-cent stamps and one charity stamp, simultaneously by the use of one coin, a nickel placed in the right hand slot and pulling the crank forward to the end of its stroke, also to vend 4 one-cent stamps and one charity stamp together with 2 two-cent stamps and one charity stamp simultaneously when coins are placed in each of the coin slots.

When a coin, a nickel, is placed in the coin slot and reaches a position in the slot 11 it connects the drum 10 with the rotating member 27. The ratio of the internal gear 14 and spur gear 13 is 1 to 2 and such that when the gear 14 moves through an arc of 90° imparted to it by the crank 18 the spur gear 13 is moved through an arc of 180°. When the rotating member 27 has moved through an arc of 180° it stops because the coin has reached the end of the retaining guard 114 and drops into the coin box 119 thus breaking the connection between the drum 10 and the rotating member 27. As the member 27 moves through an arc of 180° the gear 28 keyed to the opposite ends of the shaft 26 has turned 180°. Gear 28 is in mesh with gear 36 keyed to the shaft 38. Gear 28 has a pitch diameter equal to twice of the pitch diameter of the gear 36 so that when gear 28 turns 180° gear 36 will turn 360° consequently gear 39 keyed to the opposite end of the shaft 37 also turns 360° or a full revolution. Gear 39 has a pitch diameter equal to the diameter of the stamp delivery roller 43 and 46. The circumference of each of these delivery rollers is equal to the distance between the lines of perforation between 4 one-cent stamps on the rolls fed through rollers 43 and 46. In other words a strip of 4 one-cent stamps if placed around the surface of roller 43 would have its extreme edges meet.

Gear 40 and gear 44 have a pitch diameter equal to the pitch diameter of gear 39. Gear 39 is in mesh with the gear 40 and gear 40 is in mesh with the gear 44. Gear 40 is keyed to a shaft 41 upon which is keyed a delivery roller 43. The gear 44 is keyed to a shaft 45 on the opposite end of which is the delivery roller 46. When the gear 39 turns 360° the gear 40 and roller 43, the gear 44 and roller 46 also turn 360° or one full revolution. As the strip of one-cent stamps is in mesh with the projections on roller 46 at the line of tangency between the feed rollers 43 and 46 it is evident that one revolution of the roller will move 4 stamps forward and stop with the fourth line of perforation on the center of the slot formed by the table and the chute.

Keyed to the shaft 45 is a gear 47 in mesh with a gear 48 keyed upon a shaft 49. Gear 47 has a pitch diameter equal to one-fourth of the pitch diameter of gear 48. As gear 47 makes a complete revolution with the shaft 45 it turns gear 48 to an arc of 90° or one-fourth of revolution. As shaft 49 makes a quarter revolution gear 51 and roller 50 also make a quarter revolution. The gear 51 is in mesh with a gear 52 which has a pitch diameter equal to the pitch diameter of gear 51 and therefore gear 52 and roller 54 which are keyed to the shaft 53 also make one-quarter of a revolution. As the strip of charity stamps on the rolls is in mesh with the projections on the delivery rollers 50 and 54 on the line of tangency of the roller, and as the circumference of each roller 50 and 54 is equal to the length of four charity stamps, it is evident that one-quarter turn of the delivery rollers 50 and 54 will move one charity stamp across the slot formed by the table and the stamp chute.

When the coin engages the slot in the drum 10 and revolving member 27 and connects the same by pulling the handle 19 forward in an arc of 90 degrees 4 one-cent stamps move across the slot formed by the table and coin chute, simultaneously one charity stamp is moved across the slot formed by the edge of the stamp chute.

As the crank has moved 90° the movement of the stamps has stopped, however, the crank continues about 15° to the end of its stroke. When the coin drops in the coin box 119 the revolving member 27 stops. The clamping devices 80 are brought down upon the stamps on the tables 75 simultaneously by the upward movement of the rod 83 where they are held firmly by the cam 86 engaging the roller 85 in the end of the rod.

As the gear completes its stroke cam 95 moves beneath the roller 94 mounted in the end of the rod 93, thus imparting an upward diagonal movement to the shearing knife 91 mounted upon plates 90 in guideways 89 connected by arms 92 to the rod 94. The upward movement of the knives is such as to move diagonally across the lines of perforation of the one-cent stamps and the charity stamps on the tables simultaneously, thus the 4 one-cent stamps and one charity stamp will be severed from the rolls respectively and drop into chute 96 from which they pass through the slot 97 to the delivery chamber 98, from which they may be easily removed.

In vending a combination of 2 two-cent stamps and one charity stamp, a roll of two-cent stamps 72 is placed upon one of the rollers 74 and the first stamp in the roll is inserted between delivery rollers 58 and 61 just before the crank has reached the end of its stroke, or 90°. The stamps are so adjusted that the first line of perforations in the roll of stamps, that is the perforation between the first and second stamp, will be held by one of the projections 71 in the roller 58, when this projection is in a tangent line with the roller 58 and 61 and is in engagement with the groove 70, which is the case when the crank is at the end of its stroke. In this position the first stamp in the roll will have its outer edge over the slot formed by the table and stamp chute. At the same time a roll of charity stamps is placed upon one of the rollers 74 with the first stamp in the roll inserted between the delivery rollers 65 and 69 with its extreme edge over the slot formed by the table and adjacent edges of the chute, when the crank is at the end of its stroke or has traveled through an arc of 90°.

The gear ratio of the internal gear 14 and spur gear 13 is 1 to 2 and such that when the gear 14 is moved through an arc of 90° by means of the crank 18 the gear 13 is moved through an arc of 180°. The turning of the gear 13 keyed to the shaft 9 drives the drum 10 through a half revolution and when locked to the member 29 by a coin, a nickel, the member 29 also moves through an arc of 180° where it stops because at this point the coin, is released and dropped into the coin box, thus breaking the connection between the drum 10 and the rotating slotted member 29.

As the drum 10 moves through an arc of 180° the gear 31 fastened to the member 29 and mounted to revolve on bushing 25 also moves through an arc 180°. The gear 31 meshes with a gear 38 which revolves upon the shaft 37. The gear 31 has a pitch diameter equal to the pitch diameter of the gear 38, so that when the gear 31 makes a half revolution the gear 38 also makes a half revolution. Bolted to the gear 38 is a gear 55 which has a pitch diameter equal to the diameter of the delivery rollers 58 and 61. The circumference of each of these rollers is equal to the distance between the center line of perforation between 4 two-cent stamps on the roll, in other words a strip of 4 two-cent stamps is equal to the circumference of each roller 58 and 61.

The gear 56 and gear 59 each has a pitch diameter equal to the pitch diameter of the gear 55. The gear 55 is in mesh with the gear 56 and the gear 56 is in mesh with the gear 59. The gear 56 is keyed to the shaft 57 on the opposite end of which is keyed the roller 58. The gear 59 is keyed to a shaft 60 on one end of which is fastened a roller 61 and on the other end of the shaft is keyed a gear 62, therefore when gear 55 turns 180° or a half revolution the gear 56 and roller 58, gear 59 and roller 61 also turn a half revolution.

As the strips of two-cent stamps are meshed into the projections on the rollers 61 at the line of tangency of the delivery rollers 58 and 61 it is evident that a half revolution of these rollers will move 2 stamps forward over the table into the stamp chute 9 stopping with the second line of perforation over the slot formed by the table and the adjacent stamp chute.

Keyed to the shaft 60 is a gear 62 in mesh with a gear 63 keyed to a shaft 64; the gear 62 has a pitch diameter equal to one half of the pitch diameter of the gear 63. As gear 62 makes a half revolution with shaft 60 it drives gear 63 through an arc of 90° or one-fourth of a revolution.

As gear 63 makes a quarter of a revolution it turns gear 66 and roller 65 keyed to shaft 64 a quarter revolution. Gear 66 is in mesh with gear 67 which has a pitch diameter equal to the pitch diameter of gear 66 and therefore, gear 67 and roller 69 both keyed to the shaft 68 also make a quarter of a revolution. As a strip of charity stamps on one of the rollers 73 is secured by the projection on the delivery roller 69 at the line of tangency between the rollers 65 and 69, the circumference of each roller 65 and 69 being equal to the length of a strip of 4 charity stamps, it is evident that one quarter turn of the rollers 65 and 69 will move one charity stamp across one of the tables 75 into the stamp chute.

When the drum 10 and the revolving slotted member 29 are connected by a coin, a nickel, and the crank has moved 90° 2 two-cent stamps are moved across the table over the slot formed between the table and the adjacent stamp chute, with which one charity stamp is moved in the same relative position, simultaneously with the movement of the crank 90°. When the crank has moved 15° more or to the end of its stroke, the movement of the stamps has stopped. Upon completing a 90° movement of the crank the coin is dropped in the coin box 119 thus disconnecting the drum 10 with the revolving slotted member 29. The drum 10 continues to revolve in an arc of 15°. The clamping devices 80 are brought down upon the stamps on the tables 75 thereby clamping the stamps firmly in position. This move is accomplished by a rod 83 pivotally connected to the clamping devices. The lower end of the rod is provided with a roller 85 which engages a cam 86 upon the drum 10. As the drum 10 continues its movement in an arc of 15° shearing knives are moved upward and diagonal across the lines of perforation of the two-cent stamps and the charity stamps simultaneously by the upward movement of the rod 93 actuated by a cam 95 engaging a roller 94 in the lower end of the rod in engagement with the periphery of the drum 10 thus severing the stamp from the roll and causing the same to drop in the stamp chute through which they pass down through the slot into the receiving chamber.

Upon severing the stamps the handle 19 is released and as the drum 10 starts back through the action of the coiled spring 24, the clamping devices 80 are released, and the shearing knives returned to their normal position.

In the foregoing I have described in detail the operation of the machine in vending combinations of 2 two-cent stamps and one charity stamp and 4 one-cent stamps and one charity stamp. It is obvious that both of these combinations can be vended simultaneously by the use of two coins, one in each slot. It will also be understood that the machine can be altered to vend one or more stamps for two or more coins. This feature is illustrated in Figure 14, wherein the coin slot in the rotatable member is made to receive two coins.

As the delivery rollers 43, 46, 50, 54, 58, 61, 65 and 69 are the measuring instruments, it will be clearly understood that by changing the same and the ratio of the driving gears, the machine can be easily and quickly changed or altered to vend many articles such as tickets, ribbons and such commodities as may be mounted upon a strip or web susceptible of being cut in pre-determined lengths.

In Figures 15 to 21 both inclusive, I have illustrated an automatic electrical means for operating a coin controlled vending machine. Referring particularly to Figure 15, I have illustrated a vertical sectional fragmentary view consisting of a section of a supporting frame 201 and a base plate 202. Mounted upon the base plate 202 in suitable journals 203 is a shaft 204. Formed integral with the shaft 204 is a cylindrical drum 205 provided with oppositely disposed slots 206 and 207 adapted to register with slots 208 and 209 in corresponding slotted members 210 and 211. The member 210 is formed upon the end of the shaft 212 and the member 211 is mounted upon a sleeve 213 in which the shaft 212 is journaled. The shaft 212 and sleeve 213 supporting the members 210 and 211 in the drum 205.

The drum 205 is provided with an insulated sleeve or collar 214 over which is secured a conducting collar 215 the face of which 216 is substantially semi-circular. The collars are secured in place by lugs engaging the slots 206 and 207. At one end of the semi-circular contact 216 is a cam 217 mounted upon the drum 205 and provided upon its lower face with an insulating strip 218. The oppositely disposed slots 206 and 207 are connected by an insulating strip 219 and a contact plate 220, to the corresponding slots 208 and 209.

Keyed to the shaft 204 is a pinion 221 in mesh with a rack 222 formed integral with a core 223. The core 223 is mounted in an electro-magnet 224 mounted upon the side of the frame 201. The rack 222 is held in engagement with the gear 221 by a roller 225 mounted upon an arm 226 secured to the base 202 as shown at 227. A portion of the teeth in the rack 222 is cut away as shown at 228, the object of which will hereinafter appear.

The source of the electrical energy 229 is connected by one wire 230 to the solenoid 224. The other wire 231 is ground to the frame as at 232. The other terminal of the solenoid wire 233 is connected to a brush 234 mounted upon an insulating support 235 secured to the journal 203. The brush 234 makes contact with the segmentary contact plate 216. Mounted in the bracket 235 in circuit with the brush 234 is a contact button 236 normally held in a distended position by a coil spring 237, the object of which will hereinafter appear.

Normal circuit starts at the source of electrical energy 229 through wire 230, a terminal of the solenoid 224. Wire 231 from the source of electrical energy is grounded as at 232. A lead 233 connects a terminal of the solenoid 224 to a brush 234 bearing against the contact plate 216, thus when a coin is dropped into the slot 206 it forms a connection between the conductor 216 and the rotating member 210 mounted within the drum 205 which causes current to flow through the solenoid 224, thus setting up a magnetic flux which pulls the core 223 upward, causing the rack 222 in mesh with the pinion 221 to impart a rotary motion to the gear 221. The action would be the same if the coin was placed in the slot 207. Contact would then be made through conductor 220 and rotary member 211.

Since the gear 221 is keyed to the shaft 204, the drum 205 is caused to revolve. The coin deposited forms a key between the drum 205 and the member 210 and causes the member 210 to revolve with the drum. The coin is retained within the slots by a suitable guide, until such time as the drum has revolved about 175° at which point the cut away portion 228 on the rack 222 is directly opposite the pinion 221. The passing of the cut away portion in the rack causes a momentary pause in the driving of the pinion 221 which allows the coin to drop free from the operating elements. When the drum has revolved 175° the brush 234 has completed its travel on the contact plate 216 simultaneously with which the button 236 attached to and forming a part of the brush 234 makes contact with a cam 217 and since this cam is mounted upon the metallic drum 205 the circuit flows through the button 236 to the drum 205 and back to the ground 232, thus preserving the circuit and continuing the upward move of the rack 222. When the drum has moved 180° the coin has dropped and movement of the members 210 or 211 is stopped, however, the drum 205 continues to move about 15° because of the connection being continued through the ground from button 236 contacting with the cam 217.

When contact between the button 236 with the cam 217 is broken by the button 236 over riding the cam 217, the solenoid is de-magnetized and the button which is spring actuated returns to its normal position and travels back beneath the cam 217 in contact with the insulation 218, upon the circuit being broken and the electrical magnet being de-magnetized. The core 223 and rack 224 carried thereby drops by its own weight and through its connection with the pinion keyed upon the shaft 204, the drum 205 is returned to its normal position.

Figure 21 is a diagrammatical illustration of the operation of the contact button 236 in connection with the cam 217. This illustration shows the button 236 making contact with the cam 217 as the brush 234 is breaking contact with the plate 216. The face of the cam is inclined and the button is held in contact therewith by the spring 237. The button is again illustrated in a compressed position just before breaking contact, just after having broken contact, and lastly in the returning position engaging the insulation 218 on the under face of the cam.

In Figures 22 and 25 both inclusive is illustrated an electrical operative means for a coin controlled vending machine such means embodying a closed circuit. The structure differs somewhat from the open circuit shown in Figures 15 to 21 inclusive, in that the driving pinion 221 is in mesh with a larger driving gear 238 on a suitable bracket 239. Attached to the gear 238 is a coil spring 240 the other end of which is connected to the base of the bracket as shown at 241; the object of the spring is to assist the action of the gear.

The gear 238 is in mesh with a rack 242 connected to the core 243 of a solenoid 244. The solenoid 244 is mounted upon suitable brackets 245 secured to the frame in such a position as to cause the rack 242 to aline perfectly with the gear 238. The rack 242 is held in engagement with the gear 238 by a roller 246 mounted upon an arm 247 secured to the base of the machine.

The gear 221 is mounted upon a shaft formed integral with a drum 249. The drum has upon its periphery cams 250 adapted to engage a roller 251 mounted in the bifurcated end of a vertical shaft 252. As the roller 251 engages the cam 250 it imparts an upward motion to a vertical shaft 252 and in so doing raises an arm 253. The arm 253 has a slotted pivotal connection to the shaft 252 as shown at 254. The arm 253 is pivoted at one end as shown at 255 and mounted upon the free end in a slot 256 is a plate 257 adapted to close the slot 258 communicating with a coin chute 259.

When a coin is deposited in the slot 258 it is conveyed by the chute 259 to a slot 260 in the drum 249 where it rests in contact with a slot 261 in a revolving or rotating slotted member. The slots 260 are insulated with conductors or contact plate 262. The drum is also provided with an insulated conductor plate 263 contacting with a brush 264 formed integral with a contact button 265.

Figures 24 and 25 are diagrammatical illustrations of a normally closed circuit for operating the mechanism illustrated in Figure 22. Referring particularly to Figure 24, the source of electrical energy indicated at 266 is connected by wire 267 to a terminal of the solenoid 224. A wire 268 leading from a terminal of the solenoid 224 is grounded on the frame as indicated at 269. Also grounded on the frame is a wire 270 leading back to the source of electrical energy, thus by such a closed circuit the solenoid 224 is magnetized and raises the core 243 and likewise the rack 242 carried thereby and retains the same in a raised position.

When a coin is placed or drops in the slot 260 closing circuit between slots 260 and 261 temporary circuit starts at the source of electrical energy 266, through a wire 267, through wire 271 to a contact brush 264 through conductors 262 and 263, the coin, the slot 261 to the machine frame through the revolving member 272 to ground 269 from thence to wire 268 back to the source of electrical energy. When the coin has passed out of the slots in the drum 249 and revolving member 272 the current passes from the source of electrical energy through wire 267, wire 271 to button 265 through contact, not shown, mounted on the drum through machine frame to ground 269, wire 268 back to source of electrical energy. When the button contact is broken the core and rack are returned to their original position by action of spring 240.

The slot 258 is closed each time the machine is operated. This is a safety device to prevent the placing of a coin in the slot 258 when the source of electrical energy is exhausted. When the current ceases the solenoid becomes de-energized and the spring 240 pulls the gear 238 thus pulling down rack 242, actuating the drum 249 until the cam 250 pushes up the rod 252 and closes the slot 258 which will remain closed until electrical energy re-magnetizes electrode 244.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention, what I claim as new and desire to secure by Letters Patent is:—

1. In a vending machine a plurality of delivery rollers and a driving mechanism therefor, said drive mechanism comprising a crank shaft, a sleeve formed integral with the crank shaft, an internal gear mounted upon the sleeve, means for limiting the movement of the gear, and means for reversing and retaining the gear in a fixed position.

2. In a vending machine a plurality of delivery rollers and a driving mechanism therefor, said drive mechanism comprising a crank shaft, a crank mounted upon the shaft, a sleeve formed integral with the shaft, an internal gear mounted upon the sleeve, a section of the gear teeth omitted, stops for limiting the movement of the internal gear, a spring adapted to reverse the movement of the gear and to retain the same in a fixed position.

3. In a vending machine, a delivery mechanism comprising supply supporting rollers, corresponding delivery rollers mounted in pairs parallel to and in a line with the supply rollers, measuring means upon the delivery rollers, a delivery table mounted on the line of tangency of each pair of delivery rollers, and means for operating each pair of delivery rollers simultaneously.

4. In a vending machine a delivery mechanism comprising, a plurality of supply supporting rollers, a pair of delivery rollers mounted opposite each supply supporting roller, measuring and retaining means upon the delivery rollers, a delivery table mounted on the line of tangency of each pair of delivery rollers, and means for operating two or more pairs of rollers simultaneously through different degrees of rotation.

5. In a vending machine, in combination with a series of rocker arms mounted adjacent to the delivery tables, the arms connected at one end in pairs, a rod pivotally connected between each pair of rocker arms, bifurcated heads formed upon the free ends of each rocker arm adapted to bear against the table with their bifurcated portions extending over the edges thereof and means for imparting an upward motion to the pivotally connected rod.

6. In a vending machine in combination with a series of delivery tables, a series of clamping devices each comprising a rocker arm pivotally mounted adjacent to a table, a bifurcated head formed upon one end of each rocker arm adapted to bear against the table with one bifurcation extending over the edge thereof, a rod pivotally connected to the other end of each rocker arm and means for imparting an upward motion to the pivotally connected rod.

7. In a vending machine, in combination with a delivery table and a slotted clamping device, a shearing device comprising, a tapered shearing blade mounted adjacent to the edge of the delivery table and means for imparting a compound vertical and horizontal upward motion to the blade across the edge of the table and into the slot in the clamping device.

8. In a vending machine, in combination with a delivery table and clamping mechanism, a tapering blade mounted in a guideway diagonal with respect to the delivery table, the blade bearing against the edge of the table, and means connected with the blade for imparting a diagonal upward movement thereto.

9. In a vending machine in combination with a series of delivery tables, a shearing blade mounted in guideways, said guideways being diagonal with respect to each delivery table, and opposite each delivery table, a rod connected to each of the shearing blades and means for imparting an upward diagonal motion to the rod.

10. In a vending machine, in combination with a series of delivery tables, a slotted clamping device operating upon each delivery table, a shearing device comprising, a blade mounted in a guideway diagonal with respect to each delivery table, and beneath each table, each blade bearing against the edge of a table and adapted to engage the slot in the clamping device, a rod connected by an arm to each of the blades and means for imparting an upward diagonal motion thereto.

11. In a vending machine in combination with a series of delivery tables, a clamping device operating upon each of the delivery tables, a slot in the face of each clamping device, the slots registering with the edges of the delivery tables, a tapered shearing blade mounted in a guideway, diagonal with respect to each delivery table, and beneath each delivery table, the blade bearing against the edge of the delivery table and adapted to enter the slot in the clamping device, a vertical movable rod, a connection between the vertically movable rod and the shearing blade and means for imparting an upward diagonal motion to the blades.

12. In a vending machine for dispensing a strip of material separated into sections of definite length by perforations extending across the strip, a delivery mechanism comprising cooperating rollers adapted to revolve in opposite directions and having a circumference equal to the length of a definite member of the strip sections, a plurality of grooves, spaced apart upon the periphery of one of the rollers at a distance equal to the length of one strip section and projections correspondingly spaced upon the periphery of the other roller, said grooves and said projections each corresponding in number to the number of strip sections equal in length to the circumference of each roller.

13. In a vending machine for dispensing a strip of material separated into sections of definite length by perforations extending across the strip, a delivery mechanism comprising cooperating rollers having a circumference equal to the length of a definite number of strip sections, means for rotating the rollers in opposite directions, grooves in one of the rollers corresponding in number to the number of strip sections equal in length to the circumference of each roller, and spaced upon the periphery of one of the rollers at a distance apart equivalent to the length of one strip section and projections upon the periphery of the other roller adapted to mesh with the grooves.

14. In a vending machine for dispensing a strip of material separated into sections of definite length by perforations extending across the strip, a delivery mechanism comprising support rollers for the material to be delivered, cooperating delivery rollers between which the material is fed, means for measuring the amount of material to be dispensed, provided by constructing each delivery roller of such diameter that its cir-